United States Patent
Kasani et al.

(10) Patent No.: US 11,210,174 B2
(45) Date of Patent: Dec. 28, 2021

(54) AUTOMATED ROLLBACK FOR DATABASE OBJECTS

(71) Applicant: EMC IP Holding Company LLC, Hopkinton, MA (US)

(72) Inventors: Tatayyababu Kasani, West Godavari District (IN); Jahangeer Md, Hyderabad (IN)

(73) Assignee: EMC IP Holding Company LLC, Hopkinton, MA (US)

(*) Notice: Subject to any disclaimer, the term of this patent is extended or adjusted under 35 U.S.C. 154(b) by 207 days.

(21) Appl. No.: 16/662,920

(22) Filed: Oct. 24, 2019

(65) Prior Publication Data
US 2021/0124647 A1 Apr. 29, 2021

(51) Int. Cl.
G06F 7/00 (2006.01)
G06F 11/14 (2006.01)
G06F 16/22 (2019.01)
G06F 16/242 (2019.01)

(52) U.S. Cl.
CPC ...... *G06F 11/1451* (2013.01); *G06F 16/2219* (2019.01); *G06F 16/2282* (2019.01); *G06F 16/2433* (2019.01); *G06F 2201/80* (2013.01)

(58) Field of Classification Search
CPC ............ G06F 11/1451; G06F 16/2433; G06F 16/2219; G06F 2201/80; G06F 16/2282
USPC .................................................. 707/600–899
See application file for complete search history.

(56) References Cited

U.S. PATENT DOCUMENTS

| | | |
|---|---|---|
| 2002/0007363 A1 | 1/2002 | Vaitzblit |
| 2005/0240633 A1 | 10/2005 | Krishnaswamy et al. |
| 2010/0030824 A1 | 2/2010 | Shang et al. |
| 2010/0211815 A1 | 8/2010 | Mankovskii et al. |
| 2012/0166407 A1* | 6/2012 | Lee .................. G06F 9/466 707/703 |
| 2013/0290268 A1 | 10/2013 | Schreter |

FOREIGN PATENT DOCUMENTS

WO 2014123565 A1 8/2014

* cited by examiner

*Primary Examiner* — Isaac M Woo
(74) *Attorney, Agent, or Firm* — Ryan, Mason & Lewis, LLP

(57) ABSTRACT

A method includes identifying a database install script to be executed for a given database and parsing the database install script prior to execution to determine an object type, object name and object operation for database objects affected by the database install script. The method also includes connecting to the given database to read a definition of the database install script based at least in part on the object type, object name and object operation for the database objects affected by the database install script and generating a rollback script based at least in part on the definition of the database install script. The method further includes executing the database install script on the given database and, responsive to detecting one or more designated conditions, utilizing the rollback script to revert one or more changes to the database objects affected by the database install script.

20 Claims, 9 Drawing Sheets

AUTOMATED ROLLBACK FOR DATABASE OBJECTS

FIELD

The field relates generally to information processing, and more particularly to techniques for managing databases.

BACKGROUND

Various operations may be performed on database systems, including changes to a database schema structure in the Data Definition Language (DDL), and changes to data stored in the database in the Data Manipulation Language (DML). DDL-type changes include creation, alteration and dropping of various database objects in the database schema. DML-type changes include insertion, update, deletion and truncation of data stored in the database. Various database technologies provide functionality for rollback operations to return a database to some previous state. Rollback facilitates restoration of a database after erroneous operations are performed, to recover from crashes, etc.

SUMMARY

Illustrative embodiments of the present disclosure provide techniques for automated rollback of database objects.

In one embodiment, a method comprises identifying a database install script to be executed for a given database and parsing the database install script prior to execution to determine an object type, object name and object operation for one or more database objects affected by the database install script. The method also comprises connecting to the given database to read a definition of the database install script based at least in part on the object type, object name and object operation for the one or more database objects affected by the database install script and generating a rollback script based at least in part on the definition of the database install script. The method further comprises executing the database install script on the given database and, responsive to detecting one or more designated conditions, utilizing the rollback script to revert one or more changes to the one or more database objects affected by the database install script. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
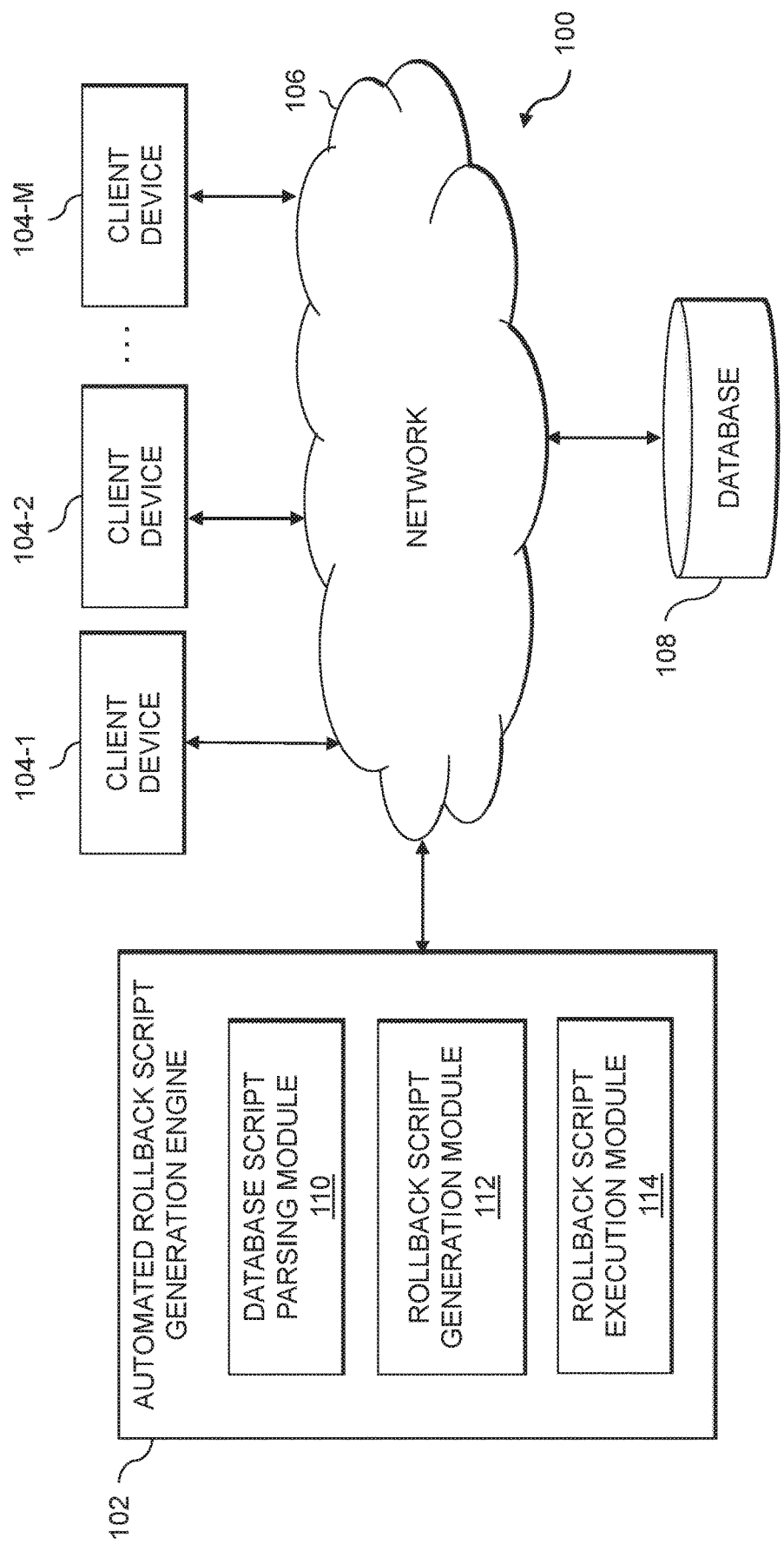
FIG. 1 is a block diagram of an information processing system for automated rollback of database objects in an illustrative embodiment.

FIG. 1 shows an information processing system 100 configured in accordance with an illustrative embodiment. The information processing system 100 is assumed to be built on at least one processing platform and provides functionality for automated rollback of database objects.

The information processing system 100 includes an automated rollback script generation engine 102, which is coupled via a network 106 to a database 108. The database 108 is assumed to be accessed, over network 106, by client devices 104-1, 104-2, . . . 104-M (collectively, client devices 104).

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The database 108 may be any type of database configured to store information accessed by users of client devices 104. The information stored in the database 108 may be in the form of database objects as will be described in further detail below.

The database 108 in some embodiments is implemented using one or more storage systems or devices associated with the automated rollback script generation engine 102. In some embodiments, one or more of the storage systems utilized to implement the application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the automated rollback script generation engine 102, as well as to support communication between the automated rollback script generation engine 102 and other related systems and devices not explicitly shown.

In some embodiments, the client devices 104 may implement host agents that are configured for communication with the automated rollback script generation engine 102. The host agents implemented by the client devices 104 may be configured to receive notifications or alerts from the automated rollback script generation engine 102, such as when a rollback script has been generated, when a database script has been executed on database 108, etc. The host agents may permit users of the client devices 104 to view available rollback scripts for database 108, to select database scripts or rollback scripts for execution, etc.

It should be noted that a "host agent" as this term is generally used herein may comprise an automated entity, such as a software entity running on a processing device. Accordingly, a host agent need not be a human entity.

Although shown as separate from the client devices 104 in the FIG. 1 embodiment, it should be appreciated that the automated rollback script generation engine 102 may be implemented at least in part within one or more of the client devices 104 in some embodiments.

The automated rollback script generation engine 102 in the FIG. 1 embodiment is assumed to be implemented using at least one processing device. Each such processing device generally comprises at least one processor and an associated memory, and implements one or more functional modules for controlling certain features of the automated rollback script generation engine 102. In the FIG. 1 embodiment, the automated rollback script generation engine 102 implements a database script parsing module 110, a rollback script generation module 112, and a rollback script execution module 114.

The automated rollback script generation engine 102 is configured to identify database install scripts that are to be executed on or for the database 108. The automated rollback script generation engine 102 may do so be monitoring communications between the client devices 104 and the database 108, so as to identify when users of the client devices 104 attempt to execute database install scripts for the database 108. The automated rollback script generation engine 102 automates the generation of rollback scripts for such database install scripts prior to execution of the database install scripts on the database 108.

The database script parsing module 110 is configured to parse the identified database install scripts prior to execution, so as to determine various information such as object types and object names for database objects of the database 108 that are affected by object operations of the database install scripts. The rollback script generation module 112 is configured to connect to the database 108 to read definitions of the database install scripts based on or utilizing the object types and object names for the database objects of the database 108 that are affected by the object operations of the database install scripts. The rollback script generation module 112 is also configured to generate rollback scripts based at least in part on the definitions of the database install scripts.

After generation of the rollback scripts, the automated rollback script generation engine 102 executes the database install scripts on the database 108. In some cases, this may be done by releasing an interrupt or otherwise permitting database install scripts that are deployed from client devices 104 to the database 108. The rollback script execution module 114 is configured to detect various conditions, such as failure of the database 108 (e.g., including failure of a database server that runs the database 108), requests from client devices 104, etc. In response to such designated conditions, the rollback script execution module 114 utilizes the rollback scripts to revert changes to database objects of the database 108 that are affected by one or more of the executed database install scripts.

It is to be appreciated that the particular arrangement of the automated rollback script generation engine 102, the database script parsing module 110, the rollback script generation module 112 and the rollback script execution module 114 illustrated in the FIG. 1 embodiment is presented by way of example only, and alternative arrangements can be used in other embodiments. As discussed above, for example, the automated rollback script generation engine 102, the database script parsing module 110, the rollback script generation module 112 and the rollback script execution module 114 may in some embodiments be implemented internal to one or more of the client devices 104. As another example, the functionality associated with the database script parsing module 110, the rollback script generation module 112 and the rollback script execution module 114 may be combined into one module, or separated across more than three modules with the multiple modules possibly being implemented with multiple distinct processors or processing devices.

At least portions of the database script parsing module 110, the rollback script generation module 112 and the rollback script execution module 114 may be implemented at least in part in the form of software that is stored in memory and executed by a processor.

It is to be understood that the particular set of elements shown in FIG. 1 for automated rollback of database objects is presented by way of illustrative example only, and in other embodiments additional or alternative elements may be used. Thus, another embodiment may include additional or alternative systems, devices and other network entities, as well as different arrangements of modules and other components. For example, the automated rollback script generation engine 102 may be connected to multiple different databases for automated generation of rollback scripts, rather than a single database 108 as shown in FIG. 1.

The automated rollback script generation engine 102 and other portions of the system 100 may be part of cloud infrastructure as will be described in further detail below.

The cloud infrastructure hosting the automated rollback script generation engine 102 may also host the database 108.

The automated rollback script generation engine 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The automated rollback script generation engine 102, client devices 104 and database 108 or components thereof may be implemented on respective distinct processing platforms, although numerous other arrangements are possible. For example, in some embodiments at least portions of the automated rollback script generation engine 102 and one or more of the client devices 104 are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the automated rollback script generation engine 102, client devices 104 and database 108, or portions or components thereof, to reside in different data centers. Numerous other distributed implementations are possible. The automated rollback script generation engine 102 or portions thereof can also be implemented in a distributed manner across multiple data centers.

Additional examples of processing platforms utilized to implement the automated rollback script generation engine 102 and other portions of the system 100 in illustrative embodiments will be described in more detail below in conjunction with FIGS. 6 and 7.

It is to be appreciated that these and other features of illustrative embodiments are presented by way of example only, and should not be construed as limiting in any way.

Figure 2:
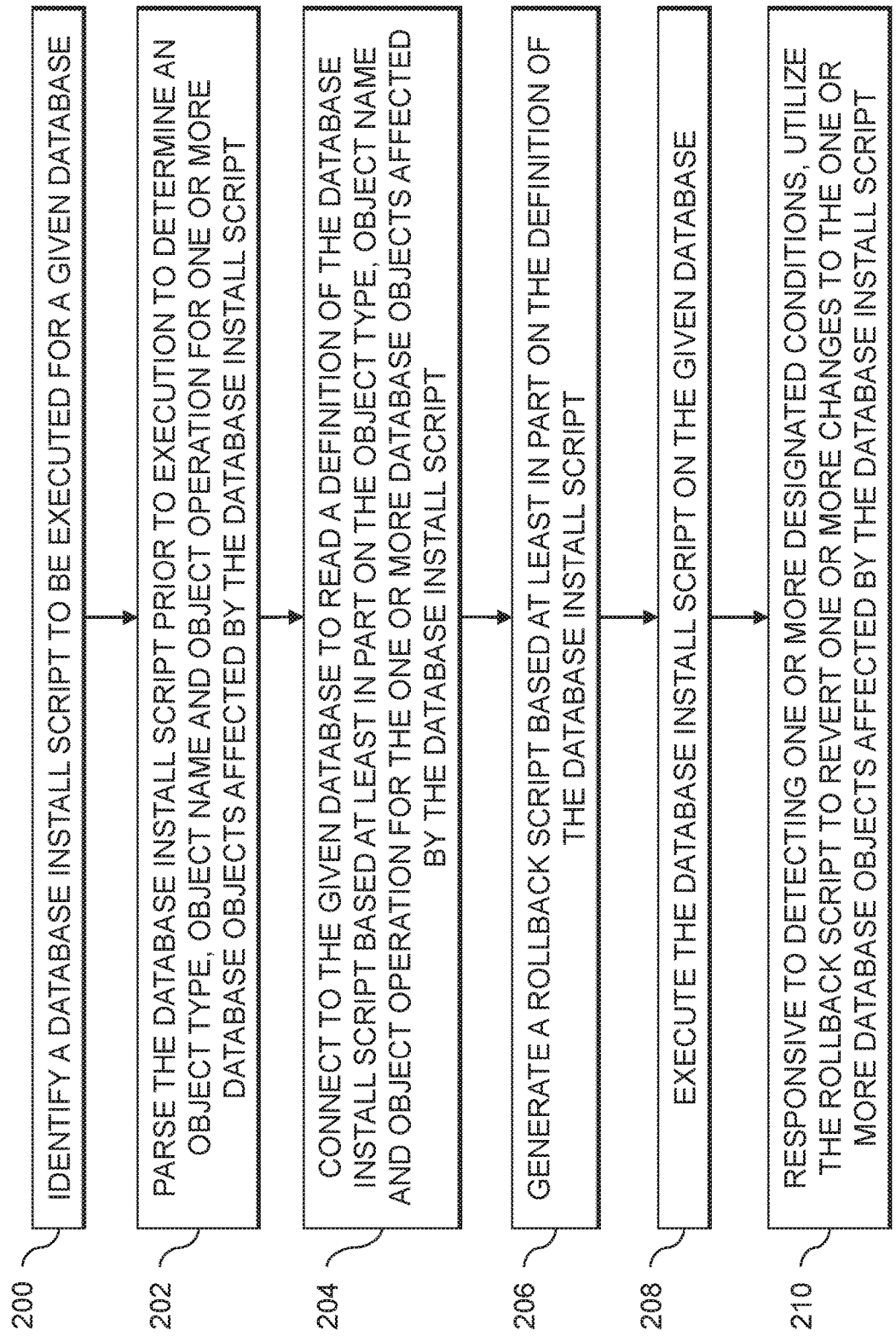
FIG. 2 is a flow diagram of an exemplary process for automated rollback of database objects in an illustrative embodiment.

An exemplary process for automated rollback of database objects will now be described in more detail with reference to the flow diagram of FIG. 2. It is to be understood that this particular process is only an example, and that additional or alternative processes for automated rollback of database objects may be used in other embodiments.

In this embodiment, the process includes steps 200 through 210. These steps are assumed to be performed by the automated rollback script generation engine 102 utilizing the database script parsing module 110, the rollback script generation module 112 and the rollback script execution module 114. The process begins with step 200, identifying a database install script to be executed for a given database, such as database 108 in FIG. 1. In step 202, the database install script is parsed prior to execution to determine an object type, object name and object operation for one or more database objects affected by the database install script.

The process continues with step 204, connecting to the given database to read a definition of the database install script based at least in part on the object type, object name and object operation for the one or more database objects affected by the database install script. In step 206, a rollback script is generated based at least in part on the definition of the database install script.

In step 208, the database install script is executed on the given database. Responsive to detecting one or more designated conditions, the rollback script is utilized in step 210 to revert one or more changes to the one or more database objects affected by the database install script. Detecting the one or more designated conditions may comprise detecting a failure affecting the given database, receiving a user request to revert the one or more changes to the one or more database objects affected by the database install script, etc.

In some embodiments, step 202 includes determining that a given one of the one or more database objects comprises a data definition language (DDL) object type specifying at least a portion of a database structure of the given database. In such cases, step 202 may further include determining an operation type of the given database object, the operation type comprising one of a create operation type, an alter operation type and a drop operation type. Responsive to determining that the operation type of the given database object is a create operation type, generating the rollback script in step 206 may comprise generating a drop definition corresponding to the determined object name of the given database object. Responsive to determining that the operation type of the given database object is an alter operation type, generating the rollback script in step 206 may comprise generating an alter definition that undoes changes to the determined object name of the given database object. Responsive to determining that the operation type of the given database object is a drop operation type, generating the rollback script in step 206 may comprise generating a create definition corresponding to the determined object name of the given database object.

In other embodiments, step 202 includes determining that a given one of the one or more database objects comprises a data manipulation language (DML) object type for modifying at least a portion of data stored in the given database. In such cases, step 202 may further include determining an operation type of the given database object, the operation type comprising one of an insert operation type comprising a give insert query statement, an update operation type comprising a given update query statement, a truncate operation type comprising a given truncate query statement, and a delete operation type comprising a given delete query statement.

Responsive to determining that the operation type of the given database object is an insert operation type, generating the rollback script in step 206 may comprise reading one or more columns and values from the given insert query statement and generating a delete query with a where clause comprising conditions with the one or more columns and values from the given insert query statement.

Responsive to determining that the operation type of the given database object is an update operation type, generating the rollback script in step 206 may comprise reading object name and where clause conditions from the given update query statement, forming a select query with the read object name and where clause conditions from the given update query statement, utilizing the select query to obtain existing values from the given database corresponding the read object name and where clause conditions from the given update query statement, and forming a new update query statement with the existing values from the given database.

Responsive to determining that the operation type of the given database object is a truncate operation type, generating the rollback script in step 206 may comprise reading an object name from the given truncate query statement, forming a backup table query statement based at least in part on the read object name, creating a backup table for an original table in the given database utilizing the backup query statement, obtaining one or more column names using the read object name, inserting data into the original table from the backup table based on the obtained one or more column names, and dropping the backup table.

Responsive to determining that the operation type of the given database object is a delete operation type, generating the rollback script in step 206 may comprises reading object name and where clause conditions from the given delete query statement, forming a select query with the read object name and where clause conditions from the given delete query statement, utilizing the select query to obtain existing values from the given database corresponding the read object name and where clause conditions from the given delete query statement, and forming an insert query statement with the existing values from the given database.

As described above, database rollback operations may be used to restore a database to some previous state. Database operations include operations in the DDL used to specify a database schema structure of the database, and operations in the DML, used to access, modify and retrieve data from the database. Database rollback, however, is a manual process which requires a developer or other user to write rollback scripts corresponding to each install script. Generally, the rollback scripts are not executed every time. The rollback scripts are instead executed on-demand when changes or operations on the database need to be rolled back. Creating and maintaining rollback scripts is a time-consuming process for such developers.

Figure 3:
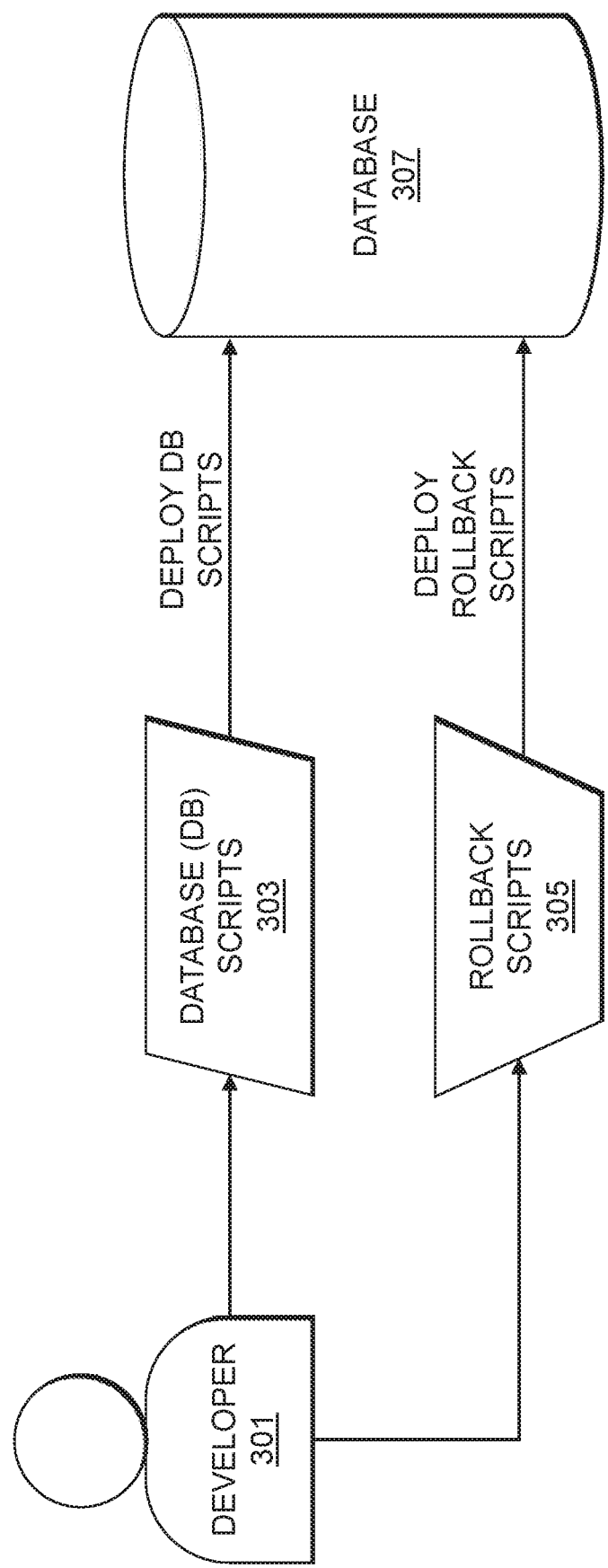
FIG. 3 is a block diagram of a system with manual rollback of database objects in an illustrative embodiment.

FIG. 3 illustrates the manual process for a developer 301 to create and maintain rollback scripts. The developer 301 generates or otherwise utilizes database (DB) scripts 303, which are deployed on database 307. The developer 301 also manually creates rollback scripts 305 (e.g., on-demand as needed), and deploys the rollback scripts 305 to rollback one or more of the DB scripts 303 previously deployed on the database 307.

Illustrative embodiments provide techniques for automating the generation of rollback scripts. In some embodiments, rollback scripts are generated by parsing DB scripts before executing or deploying the DB scripts on a database. Such parsing includes finding details such as the object type (e.g., table, view, function, procedure, trigger, type, package, package body, queue table, scheduler job, grant, revoke, synonym, sequence, constraint, index, macro, etc.) and the object name (e.g., table name, view name, function name, procedure name, trigger name, type name, package name, package body name, queue table name, scheduler job name, grant name, revoke name, synonym name, sequence name, constraint name, index name, macro name, etc.). Next, a connection is opened to the target database (e.g., a target database server) to read the definition of the DB script based on the object type, object name and object operation. Using such information, a rollback script is created with the existing object information in the database for most object types.

For DDL object types (e.g., tables, views, procedures, etc.), the rollback script includes an operation based on the operation type of the DB script. For a DB script with a create operation, the rollback script includes a drop definition. For a DB script with a drop operation, the rollback script includes a create definition. For a DB script with an alter operation, the rollback script includes another alter definition that undoes the changes of the alter operation in the DB script.

For DML object types or operations (e.g., insert, update, delete, truncate, etc.), the rollback script includes a script type based on the operation type of the DB script. For a DB script with an insert operation, a rollback script with a delete operation is created. For a DB script with a delete operation, a rollback script with an insert operation is created. For a DB script with an update operation, a rollback script with another update operation with the previous values is created with the same where clause conditions. For a DB script with a truncate operation, a rollback script is created that generates a backup table as described in further detail below.

Figure 4:
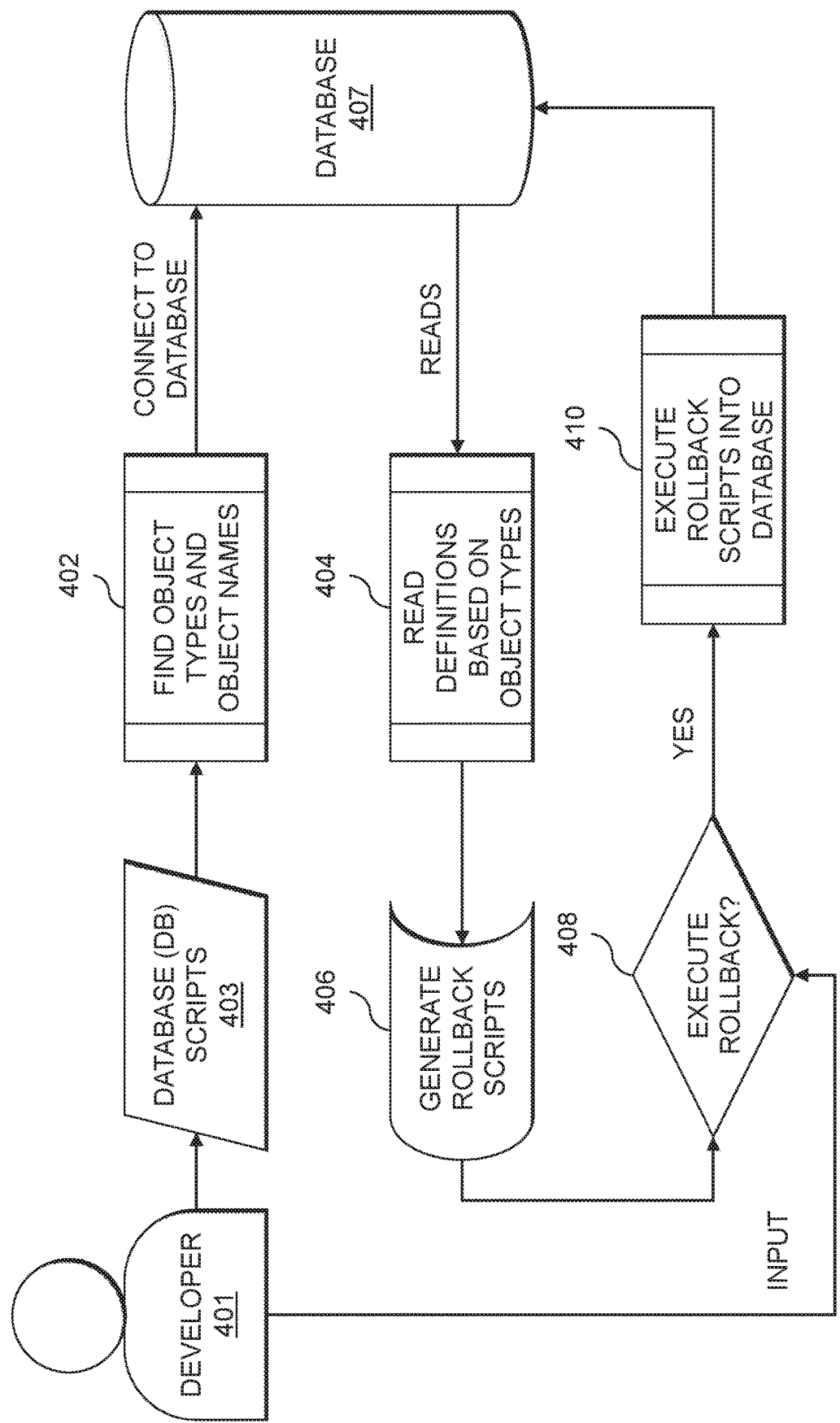
FIG. 4 is a block diagram of a system with automated rollback of database objects in an illustrative embodiment.

FIG. 4 illustrates an automated process for creating and maintaining rollback scripts. As shown, a developer 401 will generate or otherwise utilize DB scripts 403 (e.g., the developer 401 provides the DB scripts 403 as input). The automated rollback script generation engine 102 parses the scripts and in block 402 finds the object types, object names and object operations in the DB scripts 403. The automated rollback script generation engine 102 then connects to a target database 407 (e.g., the database 407 on which the DB scripts 403 will be deployed). In block 404, the automated rollback script generation engine 102 will read the definitions of the target database objects based on the object types in the DB scripts 403. In block 406, the automated rollback script generation engine 102 generates rollback scripts. In block 408, a determination is made as to whether to execute one or more of the generated rollback scripts responsive to input from the developer 401. In block 410, the automated rollback script generation engine 102 executes one or more of the rollback scripts on the target database 407 (e.g., in response to the output of the decision block 408).

Figure 5A:
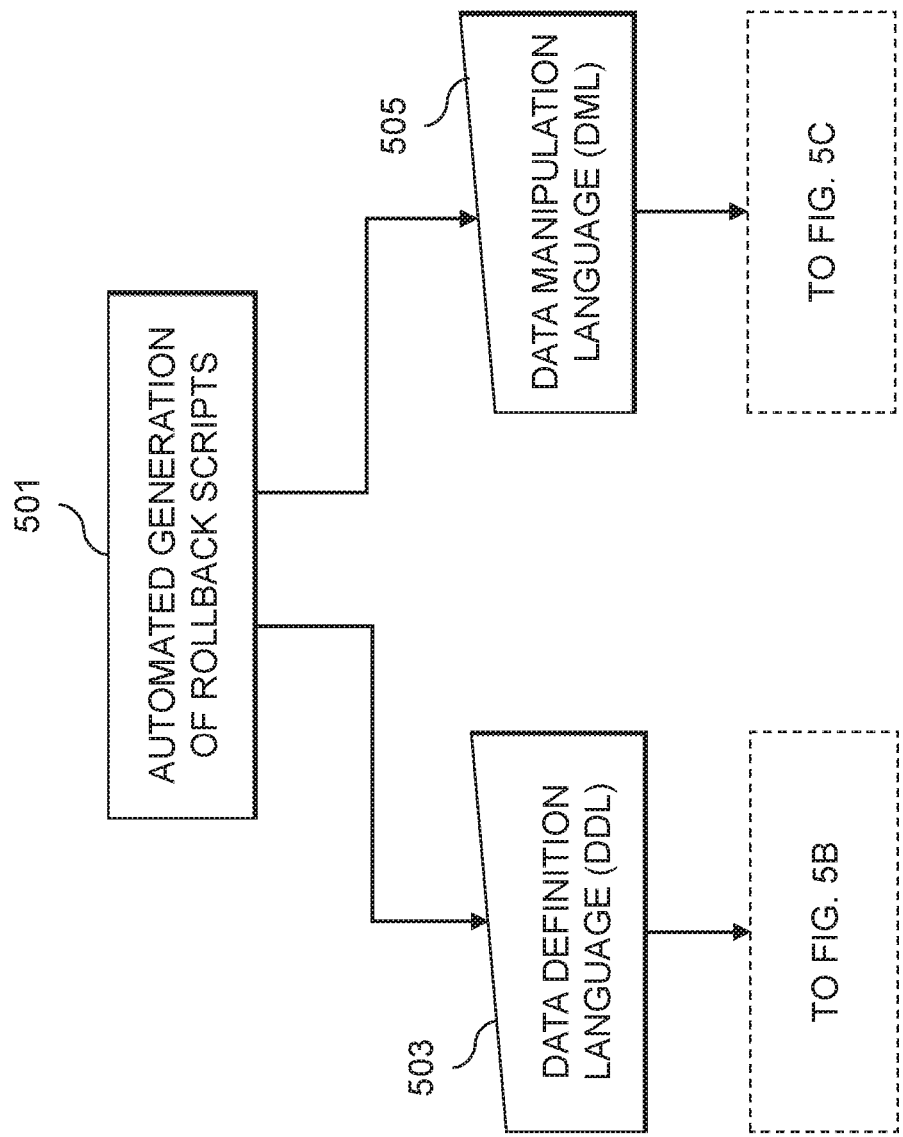
FIGS. 5A-5C show a processing flow for automated generation of rollback scripts in an illustrative embodiment.
Figure 5B:
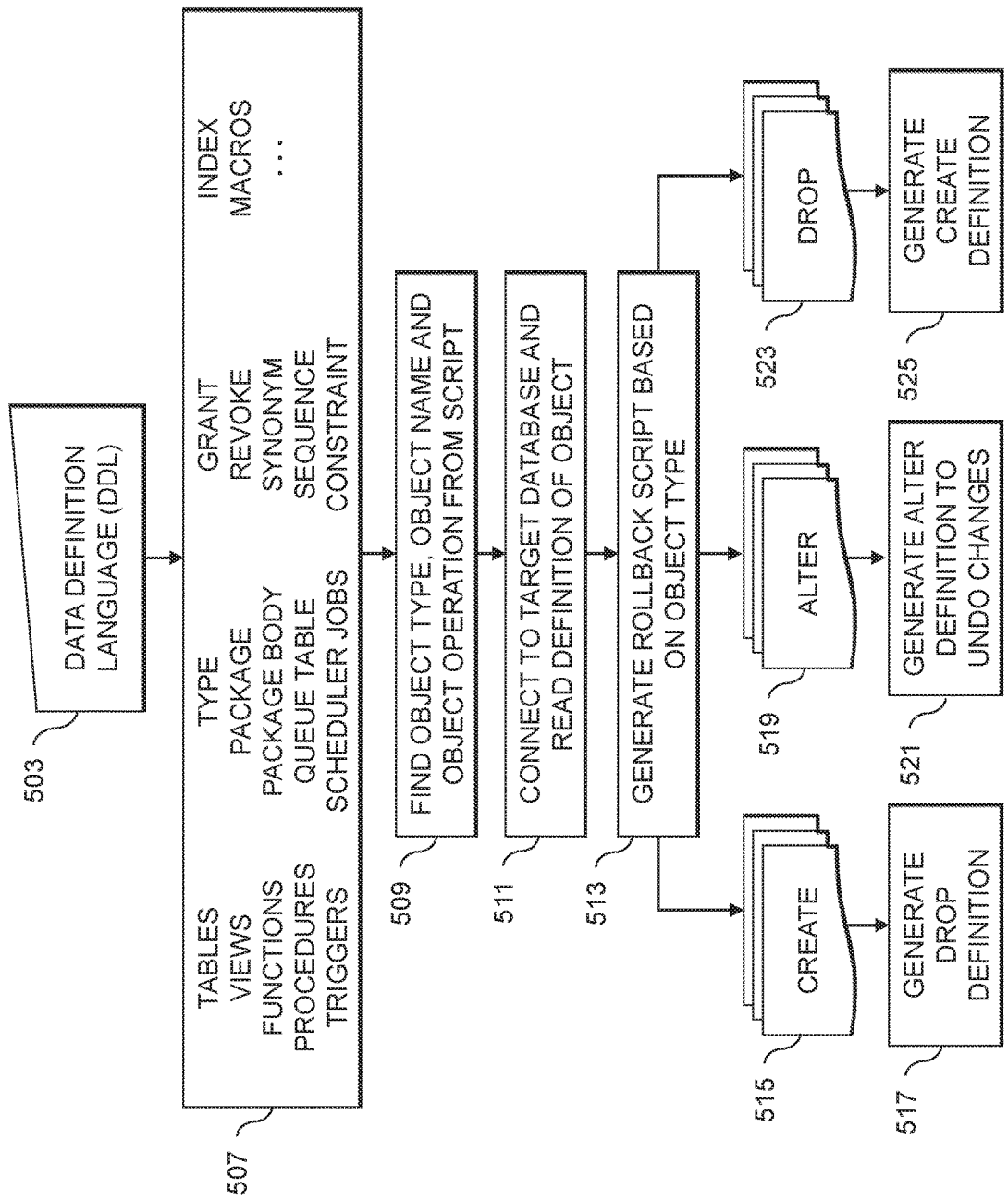
Figure 5C:
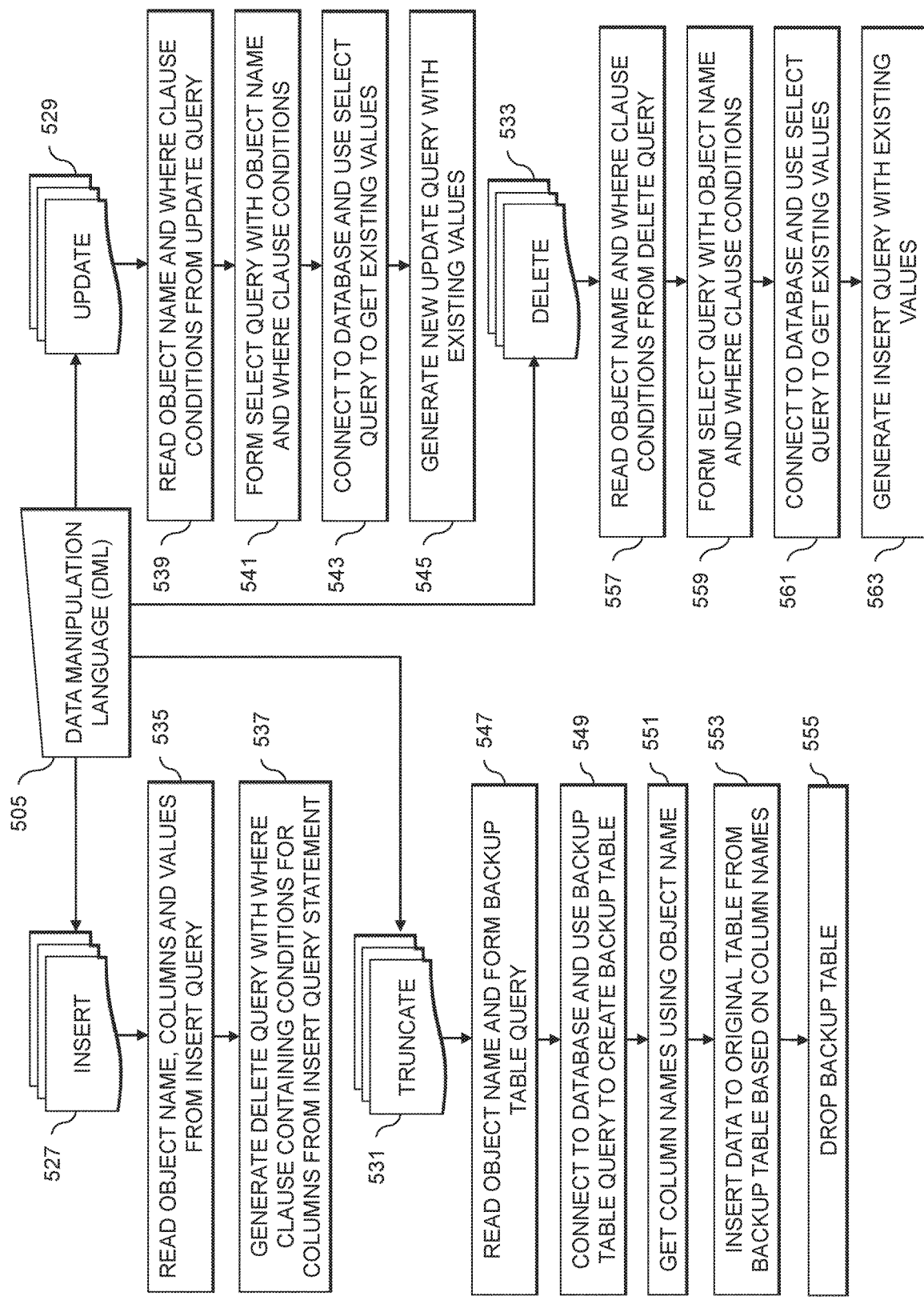

FIGS. 5A-5C illustrate a detailed workflow for generation of rollback scripts in block 406. The workflow of FIGS. 5A-5C begins in step 501, where automated generation of a rollback script is initiated. The workflow then proceeds to the flow shown in FIG. 5B if the corresponding DB script includes DDL operations 503, or to the flow shown in FIG. 5C if the corresponding DB script includes DML operations 505.

For DDL operations 503, the object type is identified. Block 507 lists various examples of database object types, such as tables, views, functions, procedures, triggers, types, packages, package body, queue tables, scheduler jobs, grants, revokes, synonyms, sequences, constraints, indexes, macros, etc. For a given DB install script for which a rollback script is to be generated, the object type, object name and object operation are identified in step 509. The object type may be one of those listed in block 507. The object operation may be one of a create operation 515, an alter operation 519 and a drop operation 523. Following step 509, the workflow proceeds to step 511 where a connection is opened to the target database to read a definition of the database object in the database schema. Then, the rollback script is generated in step 513 based on then object type of the database object. Where the object operation is a create operation 515, a drop definition is generated in step 517. Where the object operation is an alter operation 519, another alter definition is generated in step 521 which undoes the changes in the alter definition of the DB install script. Where the object operation is a drop operation 523, a create definition is generated in step 525.

For DML operations 505, the processing may be based on whether the operation in the DB install script is an insert operation 527, an update operation 529, a truncate operation 531 or a delete operation 533. If the operation is an insert operation 527, the workflow proceeds to step 535 where the object name, columns and values from the insert query are read. In step 537, a delete query is generated with a where clause that contains conditions for columns from the insert query statement.

If the operation is an update operation 529, the workflow proceeds to step 539, where the object name and where clause conditions are read from the update query. In step 541, a select query is formed with the object name and where clause conditions from the update query. A connection to the database is opened in step 543 and the select query formed in step 541 is used to get the existing values for the where clause conditions. In step 545, a new update query is generated with the existing values.

If the operation is a truncate operation 531, the workflow proceeds to step 547 where the object name is read and backup table query is formed. In step 549, a connection to the database is opened and the backup table query is used to create a backup table. Prior to step 551, there is an optional step where identity is set to on. In step 551, column names are obtained using the object name from the truncate operation 531. In step 553, data is inserted to the original table from the backup table based on the column names from the backup table query. Prior to step 555, there is an optional step where identity is set to off. In step 555, the backup table is dropped.

If the operation is a delete operation 533, the workflow proceeds to step 557 where the object name and where clause conditions are read from the delete query. In step 559, a select query is formed with the object name and where clause conditions from the delete query. A connection to the database is opened in step 561 and the select query formed in step 559 is used to get the existing values. In step 563, an insert query is generated with the existing values.

Illustrative embodiments provide techniques for automated rollback of database objects. Advantageously, the techniques described herein avoid the manual, time consuming processes for developing and maintaining rollback scripts. Further, as the rollback scripts in some embodiments are automatically generated prior to execution of corresponding DB install scripts, the rollback scripts are immediately available and ready to use in the event that a particular database operation fails or a database server hosting a database crashes during or after application of one or more database operations.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for automated rollback of database objects will now be described in greater detail with reference to FIGS. 6 and 7. Although described in the context of system 100, these platforms may also be used to implement at least portions of other information processing systems in other embodiments.

Figure 6:
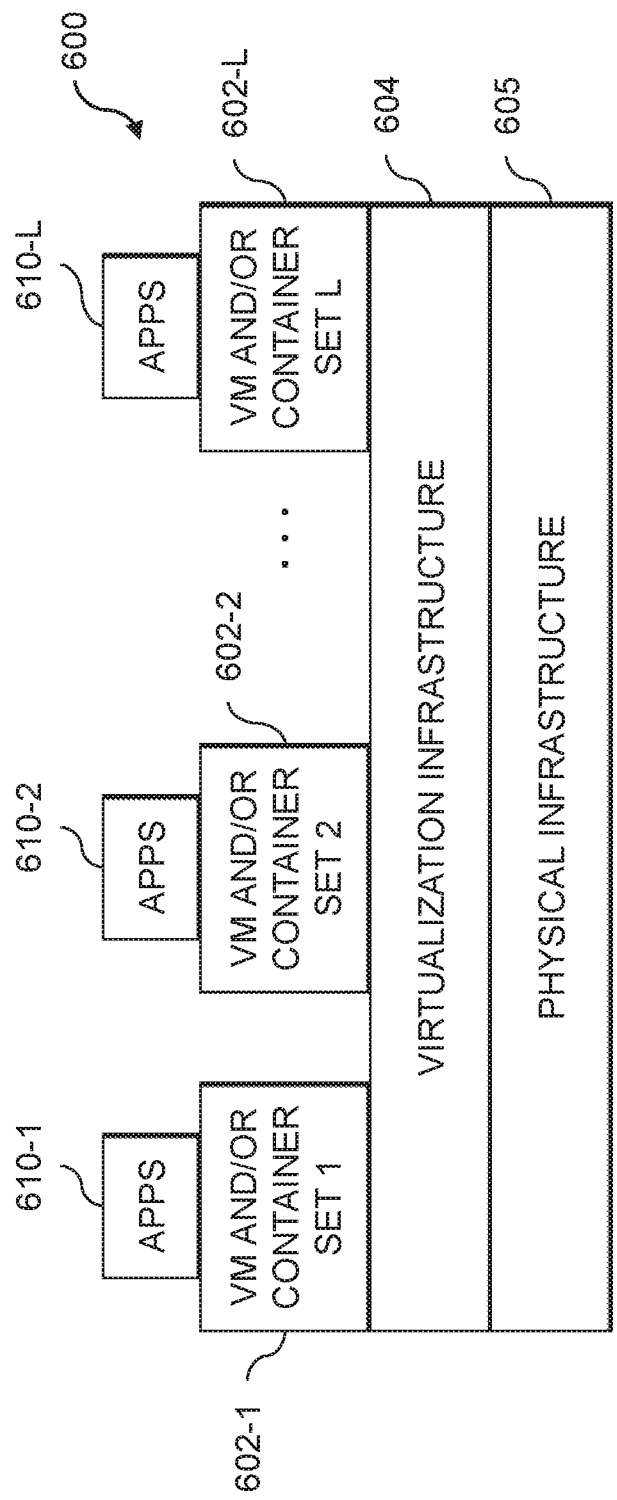
FIGS. 6 and 7 show examples of processing platforms that may be utilized to implement at least a portion of an information processing system in illustrative embodiments.
Figure 7:
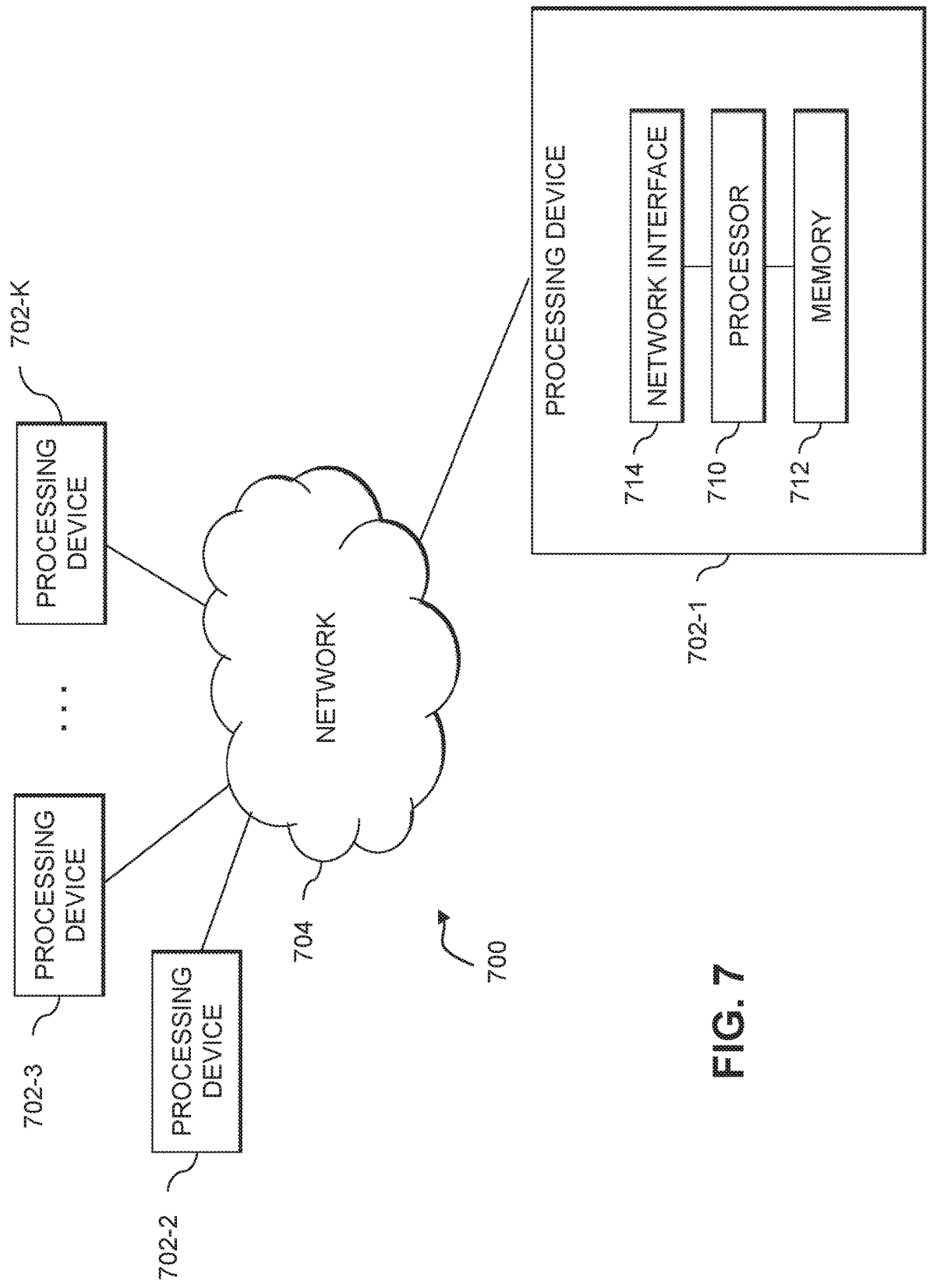

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for automated rollback of database objects as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, databases, database objects, install scripts, rollback scripts, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
    identifying a database install script to be executed for a given database;
    parsing, prior to execution of the database install script, the database install script to determine an object type, object name and object operation for one or more database objects affected by the database install script;
    connecting, prior to execution of the database install script, to the given database to read a definition of the database install script based at least in part on the object type, object name and object operation for the one or more database objects affected by the database install script;
    generating, prior to execution of the database install script, a rollback script based at least in part on the definition of the database install script;
    executing the database install script on the given database; and
    responsive to detecting one or more designated conditions during or after execution of the database install script, utilizing the rollback script to revert one or more changes to the one or more database objects affected by the database install script;
    wherein the method is performed by at least one processing device comprising a processor coupled to a memory.

2. The method of claim 1 wherein parsing the database install script comprises determining that a given one of the one or more database objects comprises a data definition language object type specifying at least a portion of a database structure of the given database.

3. The method of claim 2 further comprising determining an operation type of the given database object, the operation type comprising one of a create operation type, an alter operation type and a drop operation type.

4. The method of claim 3 wherein responsive to determining that the operation type of the given database object is a create operation type, generating the rollback script comprises generating a drop definition corresponding to the determined object name of the given database object.

5. The method of claim 3 wherein responsive to determining that the operation type of the given database object is an alter operation type, generating the rollback script comprises generating an alter definition that undoes changes to the determined object name of the given database object.

6. The method of claim 3 wherein responsive to determining that the operation type of the given database object is a drop operation type, generating the rollback script comprises generating a create definition corresponding to the determined object name of the given database object.

7. The method of claim 1 wherein parsing the database install script comprises determining that a given one of the one or more database objects comprises a data manipulation language object type for modifying at least a portion of data stored in the given database.

8. The method of claim 7 further comprising determining an operation type of the given database object, the operation type comprising one of an insert operation type comprising a give insert query statement, an update operation type comprising a given update query statement, a truncate operation type comprising a given truncate query statement, and a delete operation type comprising a given delete query statement.

9. The method of claim 1 wherein responsive to determining that the operation type of the given database object is an insert operation type, generating the rollback script comprises:
    reading one or more columns and values from the given insert query statement; and
    generating a delete query with a where clause comprising conditions with the one or more columns and values from the given insert query statement.

10. The method of claim 1 wherein responsive to determining that the operation type of the given database object is an update operation type, generating the rollback script comprises:
   reading object name and where clause conditions from the given update query statement;
   forming a select query with the read object name and where clause conditions from the given update query statement;
   utilizing the select query to obtain existing values from the given database corresponding the read object name and where clause conditions from the given update query statement; and
   forming a new update query statement with the existing values from the given database.

11. The method of claim 1 wherein responsive to determining that the operation type of the given database object is a truncate operation type, generating the rollback script comprises:
   reading an object name from the given truncate query statement;
   forming a backup table query statement based at least in part on the read object name;
   creating a backup table for an original table in the given database utilizing the backup query statement;
   obtaining one or more column names using the read object name;
   inserting data into the original table from the backup table based on the obtained one or more column names; and
   dropping the backup table.

12. The method of claim 1 wherein responsive to determining that the operation type of the given database object is a delete operation type, generating the rollback script comprises:
   reading object name and where clause conditions from the given delete query statement;
   forming a select query with the read object name and where clause conditions from the given delete query statement;
   utilizing the select query to obtain existing values from the given database corresponding the read object name and where clause conditions from the given delete query statement; and
   forming an insert query statement with the existing values from the given database.

13. The method of claim 1 wherein detecting the one or more designated conditions comprises detecting a failure affecting the given database.

14. The method of claim 1 wherein detecting the one or more designated conditions comprises receiving a user request to revert the one or more changes to the one or more database objects affected by the database install script.

15. A computer program product comprising a non-transitory processor-readable storage medium having stored therein program code of one or more software programs, wherein the program code when executed by at least one processing device causes the at least one processing device to perform steps of:
   identifying a database install script to be executed for a given database;
   parsing, prior to execution of the database install script, the database install script to determine an object type, object name and object operation for one or more database objects affected by the database install script;
   connecting, prior to execution of the database install script, to the given database to read a definition of the database install script based at least in part on the object type, object name and object operation for the one or more database objects affected by the database install script;
   generating, prior to execution of the database install script, a rollback script based at least in part on the definition of the database install script;
   executing the database install script on the given database; and
   responsive to detecting one or more designated conditions during or after execution of the database install script, utilizing the rollback script to revert one or more changes to the one or more database objects affected by the database install script.

16. The computer program product of claim 15 wherein parsing the database install script comprises:
   determining that a given one of the one or more database objects comprises a data definition language object type specifying at least a portion of a database structure of the given database; and
   determining an operation type of the given database object, the operation type comprising one of a create operation type, an alter operation type and a drop operation type.

17. The computer program product of claim 15 wherein parsing the database install script comprises:
   determining that a given one of the one or more database objects comprises a data manipulation language object type for modifying at least a portion of data stored in the given database; and
   determining an operation type of the given database object, the operation type comprising one of an insert operation type comprising a give insert query statement, an update operation type comprising a given update query statement, a truncate operation type comprising a given truncate query statement, and a delete operation type comprising a given delete query statement.

18. An apparatus comprising:
   at least one processing device comprising a processor coupled to a memory;
   the at least one processing device being configured to perform steps of:
      identifying a database install script to be executed for a given database;
      parsing, prior to execution of the database install script, the database install script to determine an object type, object name and object operation for one or more database objects affected by the database install script;
      connecting, prior to execution of the database install script, to the given database to read a definition of the database install script based at least in part on the object type, object name and object operation for the one or more database objects affected by the database install script;
      generating, prior to execution of the database install script, a rollback script based at least in part on the definition of the database install script;
      executing the database install script on the given database; and
      responsive to detecting one or more designated conditions during or after execution of the database install script, utilizing the rollback script to revert one or more changes to the one or more database objects affected by the database install script.

19. The apparatus of claim 18 wherein parsing the database install script comprises:

determining that a given one of the one or more database objects comprises a data definition language object type specifying at least a portion of a database structure of the given database; and determining an operation type of the given database object, the operation type comprising one of a create operation type, an alter operation type and a drop operation type.

20. The apparatus of claim 18 wherein parsing the database install script comprises:

determining that a given one of the one or more database objects comprises a data manipulation language object type for modifying at least a portion of data stored in the given database; and determining an operation type of the given database object, the operation type comprising one of an insert operation type comprising a give insert query statement, an update operation type comprising a given update query statement, a truncate operation type comprising a given truncate query statement, and a delete operation type comprising a given delete query statement.

* * * * *